3,187,034
CONDENSATION PRODUCTS CONTAINING PHOSPHONIC ACID DIESTER GROUPS
Hans Holtschmidt, Cologne-Stammheim, Eberhart Degener, Leverkusen, and Günther Braun, Cologne-Flittard, Germany, assignors to Farbenfabriken Bayer Aktiengesellschaft, Leverkusen, Germany, a corporation of Germany
No Drawing. Filed Nov. 20, 1961, Ser. No. 153,676
Claims priority, application Germany, Nov. 26, 1960, F 32,636
14 Claims. (Cl. 260—453)

This invention relates to phosphorous compounds and more particularly to compounds based on phosphites which contain phosphonic acid groups.

The reaction of alpha-halo-alkyl benzenes with alkyl phosphites so that one mol of an alkyl halide is split off to form an aryl methane phosphonic acid ester is known. This reaction is called the "Arbusow reaction." However, attempts to react alkyl phosphites with alpha-halo-alkyl aryl isocyanates under the same conditions as reaction of the unsubstituted benzene compounds have been unsuccessful because the trivalent phosphorous exerts a strong polymerizing influence on the isocyanate radicals and a trimer is obtained. Indeed, this process is the subject of U.S. Patent 2,801,244 wherein aromatic diisocyanates are polymerized in the presence of trivalent phosphorous to yield trifunctional isocyanate trimers.

It is therefore an object of this invention to provide condensation products containing phosphonic acid radicals which result from the reaction of an alkyl phosphite and an alpha-halo-alkyl aryl isocyanate without the substantial formation of polymerization products of said isocyanate. In other words, it is an object of this invention to provide for the reaction of alkyl phosphites with isocyanates to form new useful products without the disadvantage of polymerization of the isocyanate. Another object of this invention is to provide for the production of flame-resistant condensation products. Still another object of this invention is to provide a method of preparing improved polyurethane plastics containing phosphonic acid groups. A further object of this invention is to provide a method of carrying out the Arbusow reaction between alkyl phosphites and alpha-halo-alkyl benzenes which are substituted with isocyanate radicals to split out an alkyl halide and yield a phosphonic acid ester. Still a further object of this invention is to provide compounds capable of isocyanate reaction which contain phosphonic acid radicals.

The foregoing objects and others which will become apparent from the following description are accomplished in accordance with the invention, generally speaking, by providing condensation products containing phosphonic acid groups which are obtained by reacting an aliphatic phosphite and water or an organic compound containing at least one active hydrogen containing group as determined by the Zerewitinoff method with an alpha-halo-alkyl aryl isocyanate. It is preferred to carry out the reaction of the aliphatic phosphite and the active hydrogen containing compound with the isocyanate simultaneously. By adding the active hydrogen containing compound and preferably an alcohol or a phenol to the reaction mixture, an influence is exerted on the aromatic nucleus so that the relative reactivity of the functional groups is properly adjusted to cause the Arbusow reaction to take place at a much lower temperature than is usually the case and for the reaction between the active hydrogen containing groups and the isocyanate groups to proceed to produce a novel and useful condensate with an alkyl halide being split off. It is surprising that the reaction proceeds in this way because when an alpha-halo-alkyl aryl isocyanate is reacted with an organic compound containing active hydrogen containing groups, such as an alcohol, in the absence of an alkyl phosphite, the active hydrogen containing group always reacts at least partially with the halo-alkyl group to split out an hydrogen halide thus yielding unpredictable and often unsatisfactory products. But, when the reaction is carried out with all three components, the Arbusow reaction will proceed at a much lower temperature preferably within the range of from about 15° C. to about 180° C. and the reaction between the active hydrogen containing group and the —NCO groups proceeds also at a low temperature so that predictable products are obtained.

While the products of the reaction between the aliphatic phosphite and water or an organic compound containing at least one active hydrogen containing group as determined by the Zerewitinoff method with an alpha-halo-alkyl aryl isocyanate does not always produce compounds which have definite chemical formulas, many of the compounds can be identified by formula as shown in the working examples given below where essentially monomeric compounds are produced. In some cases, however, polymeric compounds are produced which may be cellular products, for example, which cannot be accurately defined by a chemical formula. Those compounds which can be defined by a formula are preferably represented by the following generic formula

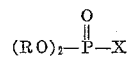

wherein R is an alkyl radical preferably containing from 1 to 10 carbon atoms such as, for example, methyl, ethyl, propyl, butyl and the like up to and including decyl and the various positional isomers thereof and X is a radical obtained by removing the halogen atom from an alpha-halo-alkyl aryl isocyanate such as, for example, those set forth below, for example, those having the formula

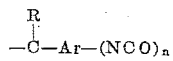

wherein R, Ar and n have the meanings set forth below beneath the formula for the alpha-halo-alkyl aryl isocyanate employed in accordance with the process of the invention.

Any suitable aliphatic phosphite may be used in the process of the invention but it is preferred to use trialkyl phosphites which are triesters of phosphorous acid with saturated and/or unsaturated alcohols. These alcohols may be substituted, for example, by halogen atoms such as chlorine, bromine and the like. Moreover, one may use aliphatic phosphites which contain two or more phosphite groups. Specific examples of suitable phosphites are trimethyl phosphite, triethyl phosphite, tri-N-butyl phosphite, triisobutyl phosphite, tri-beta-chloroethyl phosphite, triallyl phosphite, tribenzyl phosphite, tri-beta-phenyl ethyl phosphite and compounds having the formula

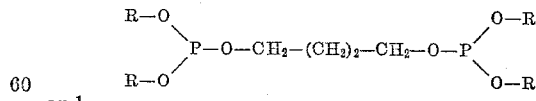

and

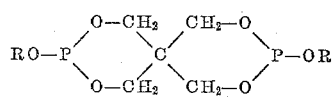

wherein R is methyl, ethyl, propyl, butyl, allyl, amyl, hexyl and the various positional isomers thereof, beta-chloroethyl, gamma-chloropropyl and the like. It is preferred to use trialkyl phosphites which contain from 1 to 8 carbon atoms.

Any suitable alpha-halo-alkyl aryl isocyanate may be used. These isocyanates are prepared by well known methods by the halogenation of an alpha-halo-alkyl aryl isocyanate with an halogen such as chlorine, bromine or a sulphuryl halide such as, for example, sulfonyl chloride, sulfonyl bromide and the like. It is preferred that the alpha-halo-alkyl aryl isocyanate contain from 1 to 3 alpha-halo substituted alkyl groups. The aromatic nucleus or nuclei may contain one or more free isocyanate groups. Thus, suitable alpha-halo-alkyl aryl isocyanates are, for example, 4-alpha-chloroethyl phenyl isocyanate, 4-dichloromethyl-1,3-phenylene diisocyanate, 4-bromoethyl-1,3-phenylene diisocyanate, alpha-chlorodiphenyl methane-4,4'-diisocyanate, 4,6-bis-(alpha-chloroisopropyl)-1,3-phenylene diisocyanate, alpha-chlorotriphenyl methane triisocyanate, alpha-chloromethyl-2,4-toluylene diisocyanate, alpha-chloromethyl-2,6-toluylene diisocyanate and mixtures thereof particularly in the ratio of 80 percent 2,4- and 20 percent 2,6-isomers and 65 percent 2,4- and 35 percent 2,6-isomers. Those compounds having the formula

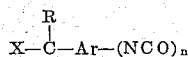

wherein X is an halogen such as chlorine, bromine and the like, Ar is an aromatic radical such as phenylene, naphthylene and the like, $n$ is from 1 to 6 and preferably 1 to 3 and R is hydrogen, aliphatic, aromatic, alicyclic, Ar—(NCO)$_n$ and the like are preferred. Any suitable aliphatic radical may be R in the foregoing formula such as, for example, methyl, ethyl, propyl, butyl, amyl and the like and araliphatic radicals such as benzyl and the like. Any suitable aromatic radical may be R in the foregoing formula such as, for example, phenyl, naphthyl and the like. Any suitable alicyclic radical may be R in the foregoing formula such as, for example, cyclohexyl, cyclopentyl, cyclopentadienyl and the like.

Any suitable organic compound containing at least one active hydrogen containing group as determined by the Zerewitinoff method may be used. Of course, the active hydrogen containing group is reactive with an —NCO group. The active hydrogen atoms are usually attached to oxygen, nitrogen or sulfur atoms. Thus, suitable active hydrogen containing groups as determined by the Zerewitinoff method include —OH, —NH$_2$, —NH—, —COOH, —SH and the like. Examples of suitable types of organic compounds containing at least one active hydrogen containing group are alcohols, phenols, primary amines, secondary amines, carboxylic acids, mercaptans and the like. It is preferred to use compounds containing —OH groups including the phenols and the alcohols. Alcohols are intended to cover hydroxyl polyesters, polyhydric polyalkylene ethers, polyhydric polythioethers, polyacetals, aliphatic polyols including alkane, alkene and alkyne, diols, triols, tetrols and the like. Phenols include those compounds containing one phenolic hydroxyl group or more than one phenolic group including, for example, phenol, cresol, 2,2'-bis-para-hydroxyphenyl propane, 4,4'-dihydroxydiphenyl methane and the like. Examples of suitable monohydric alcohols are methyl alcohol, ethyl alcohol, propyl alcohol, butyl alcohol, allyl alcohol, benzyl alcohol and the like.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha-beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxylpolyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylolpropane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, volume 7, pages 257 to 262, published by Interscience Publishers, Incorporated (1951), or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexanediol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as, 1-hexene-1,3,6-triol and the like; alkyne triols such as, 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing one or more —SH groups may be used such as, for example, dodecyl mercaptan, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example 3-hexyne-1,6-dithiol and the like.

Any suitable polyamine may be used including, for example, aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridine, 2,4-diamino-5-aminomethyl pyrimidine, 2,5-diamino-1,3,4-thiadiazole and the like.

Other alcohol compounds which do not necessarily fit within any of the previously set forth classes of compounds and which nevertheless contain active hydrogen containing groups which are quite suitable for the production of the polyurethane plastics of the present invention are pentaerythritol, sorbitol, triethanolamine, mannitol, N,N,N',N' - tetrakis(2 - hydroxypropyl)ethylene diamine, acetoacetic ester, malonic ester, glycerine diacrylate or others, for example, urea as well as compounds of any of the classes set forth above which are substituted with halogen such as, for example, chloro, iodo, bromo and the like; nitro; alkoxy, such as, for example, methoxy, ethoxy, propoxy, butoxy and the like; carboalkoxy such as, for example, carbomethoxy, carbethoxy and the like; dialkyl amino such as, for example, dimethyl amino, diethyl amino, dipropyl amino, methylethyl amino and the like; mercapto, carbonyl, thiocarbonyl, phosphoryl, phosphato and the like.

The process of carrying out the present invention may be modified depending on the purpose for which the products of the process are to be used. It is preferred to react the aliphatic phosphite and the alpha-halo-alkyl aryl isocyanate together in approximately equivalent quantities based on the alpha-halo-alkyl groups of the isocyanate and the aliphatic groups of the phosphites. It is also preferred to react the compound containing at least one active hydrogen containing group in a quantity substantially equivalent to the —NCO groups present so that the active hydrogen group to —NCO group ratio is approximately one. But, if a polyisocyanate is used, it is satisfactory to employ less than an equivalent quantity of the active hydrogen containing material because the Arbusow reaction will proceed if one of the isocyanate groups on the aromatic ring is reacted with an active hydrogen containing compound. Thus, it is possible in accordance with the invention to produce phosphorous containing isocyanates which also have urethane or urea groups and phosphonic acid groups by starting with an alpha-halo-alkyl aryl polyisocyanate, an equivalent quantity of an alkyl phosphite and less than enough of an active hydrogen containing compound such as a phenol to react with all of the free —NCO groups. If free isocyanate groups are not desired, then it is possible to use an excess of the active hydrogen containing compound so that all of the free —NCO groups react to yield urethane or urea groups and indeed it is possible if a polyhydric alcohol is used, for example, to prepare a product having free hydroxyl groups which are available for further reaction to prepare esters, ethers, urethanes and the like.

It is also possible to use water as a reactant to tie up the —NCO groups so that the Arbusow reaction will proceed. In this case, two molecules of the original isocyanate are joined together and $CO_2$ is split off. It is preferred to use the organic compound containing active hydrogen containing groups and particularly preferred are polyhydric alcohols, phenols and the like as more particularly set forth above.

The reactants may be combined in any suitable manner provided that temperature conditions are properly maintained to prevent premature and undesirable side reactions or that the time that these components are allowed to set prior to combination with the third component is not too long. For example, the trialkyl phosphite and the compound containing active hydrogen may be added simultaneously to the alpha-halo-alkyl aryl isocyanate and indeed this method of carrying out the process of the invention is preferred. It is also possible, however, to add the trialkyl phosphite and the alpha-halo-alkyl aryl isocyanate to the compound containing active hydrogen or alternately the trialkyl phosphite and the active hydrogen containing compound may be added together to the isocyanate. Finally, the reaction according to the invention can be carried out in stages by first initiating the Arbusow reaction with less than the equivalent quantity of the active hydrogen containing compound and then further reacting the remaining —NCO groups with the same or another reactant containing active hydrogen containing groups. It is essential to the invention, however, that the reaction be carried out in such a fashion that the —NCO groups are not caused to polymerize by the trivalent phosphorous and so that the active hydrogen compound does not react with the alpha-halo-alkyl compound. The best way to insure that these undesirable reactions do not take place is to simultaneously combine the three types of reactants.

The reaction of the three components is exothermic and will take place at low temperatures. It is preferred to carry the reaction out at a temperature within the range of from about 15° C. to about 180° C. Generally speaking, the reaction is carried out in the absence of a solvent but a solvent such as acetic ester, xylene, ethylene glycol acetate monoethyl ether or the like may be employed if desired. In the reaction, an alkyl halide is split off and where a lower alkyl radical was the substituent on the aliphatic phosphite, the resulting alkyl halide is gaseous and is easily separated from the reaction mixture. But, if it is not gaseous, it can be easily separated from the reaction mixture by distillation.

The process of the invention is particularly useful for the preparation of cellular polyurethane plastics having good flame-resistance. In this process, a polyfunctional organic compound having active hydrogen containing groups as determined by the Zerewitinoff method is combined with an alpha-halo-alkyl aryl isocyanate and an aliphatic phosphite in the presence of a blowing agent such as, for example, water which blows the plastic by reaction with the —NCO groups to release $CO_2$ or a halohydrocarbon such as dichlorodifluoro methane, trichlorofluoro methane and the like. Stabilizers and catalysts may also be used in accordance with heretofore known methods. Suitable stabilizers are, for example, sulphonated castor oil, polydimethyl siloxane, alkyl silane oxyalkylene block copolymers such as

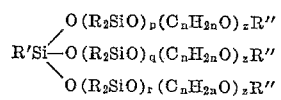

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to 34. Most preferred is a compound having the formula

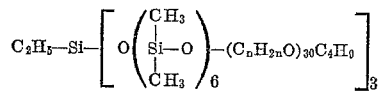

wherein ($C_nH_{2n}O$) is a mixed polyoxyethylene and oxypropylene block copolymer containing about 17 oxyethylene units and about 13 oxypropylene units. Any suitable catalyst may be used such as, for example, tertiary amines, such as triethylene diamine, N-methyl morpholine, N-ethyl morpholine, triethyl amine and the like as well as compounds containing tin such as dibutyl tin dilaurate, dibutyl tin di-2-ethyl hexoate, stannous octoate, stannous oleate and other tin salts of carboxylic acids some of which may contain direct carbon to tin bonds.

The condensation products containing phosphonic acid groups according to the present invention are usually viscous oils which are useful as starting materials for the preparation of plastics and particularly for imparting good flame-resistant properties to plastics. The invention may also yield high molecular weight solid products which can be used for various uses in plastics including additives to impart flame-resistance. Moreover, the products of the invention are useful for the production of coatings for wood, metal such as steel and the like, adhesives, castings and the like. They may also be used for insecticides.

The invention is further illustrated by the following examples in which the parts are by weight unless otherwise indicated.

*Example 1*

About 208.5 parts of 4-chloromethyl-1,3-phenylene diisocyanate are slowly heated to about 90° C. with about 297 parts of tri-beta-chloroethyl phosphite (89 percent) and about 216 parts of cresol in vacuo, ethylene chloride distilling off. About 625 parts of an oil are obtained. The oil consists substantially of the compound

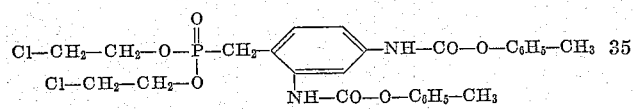

*Example 2*

About 53 parts of diethylene glycol are added to a mixture of about 254 parts of 4-bromomethyl-1,3-phenylene diisocyanate and about 287 parts of tri-beta-chloroethyl phosphite (89 percent) at a temperature of from about 20° C. to about 25° C. The mixture is allowed to stand for about two days. The chlorobromoethane which has formed is then distilled off in an oil pump vacuum. About 470 parts of an oil are left. The oil consists substantially of the compound

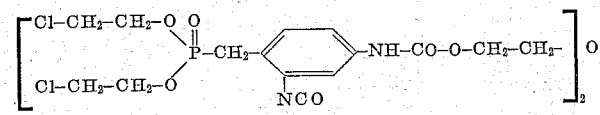

*Example 3*

A mixture of about 51.4 parts of diethylene glycol and about 1.34 parts of trimethylolpropane is introduced dropwise into a mixture of about 284.5 parts of a diphenyl chloromethane-4,4' - diisocyanate chlorinated on the side chains and about 297 parts of tri-beta-chloroethyl phosphite at from about 25 to about 30° C. The reaction solution is heated in a water jet vacuum to about 80° C. About 538 parts of an oil are left. The oil consists of the compounds

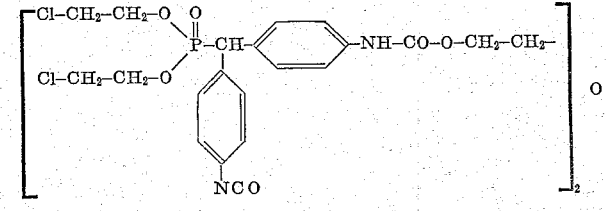

and

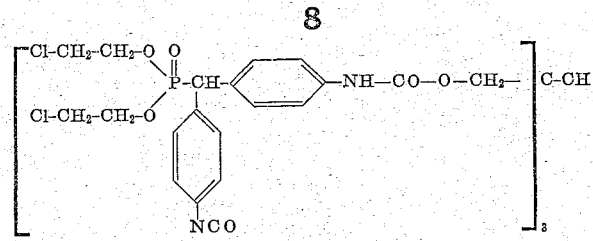

*Example 4*

About 1040 parts (about 5 mols) of an isomer mixture of the isocyanates

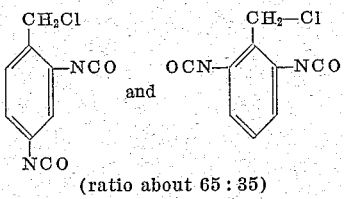

(ratio about 65 : 35)

are mixed with about 1350 parts of tri-beta-chloroethyl phosphite. About 1060 parts of diethylene glycol are added dropwise to the resulting mixture while cooling with water. The diethylene glycol is added at such a rate that the temperature of the reaction mixture does not exceed from about 50° C. to about 60° C. The mixture is stirred for about 2 hours at from about 80° C. to about 90° C. About 550 parts of ethylene chloride are distilled off by applying a water jet vacuum.

The product formed is a viscous resin, from which incombustible plastics can be produced. OH number about 85, yield about 2680 parts.

*Example 5*

About 100 parts of a highly branched polyester (11.5 percent OH) obtained by condensing about 4.1 mols of 1,2,6-hexane triol with about 2.5 mols of adipic acid and about 0.5 mol of phthalic anhydride are thoroughly mixed with about 2 parts of permethylated amino ethyl piperazine, about 0.3 part of dibutyl tin dilaurate, about 0.3 part of a residue of a polysiloxane comprising polyalkylene glycol ether and about 6 parts of sodium castor oil sulphate (50 percent water). The resulting mixture is reacted with a solution of about 25 parts of an equimolar mixture of diphenyl chloromethane-4,4'- diisocyanate and tri-beta-chloroethyl phosphite in about 131 parts of diphenyl methane diisocyanate. A foam material is formed which has good flame-resistance and the following physical properties:

| | |
|---|---|
| Density | kg./m.$^3$ 37 |
| Compressive strength | kg./cm.$^2$ 1.4 |
| Impact toughness | kg./cm.$^2$ 0.3 |
| Hot-bending strength | ° C. 137 |
| Water absorption | percent 1.8 |

*Example 6*

About 80 parts of a polyether (addition product of propylene oxide to trimethylolpropane: 11.7 percent OH) are stirred with about 20 parts of a propoxylated ethylene diamine (22.1 percent OH), about 2 parts of permethylated amino ethyl piperazine, about 0.5 part of an alkyl silane oxyalkylene block copolymer having the formula

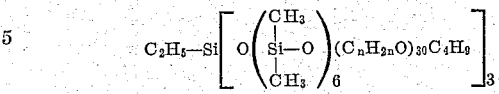

wherein ($C_nH_{2n}O$) is a mixed polyoxyethylene and oxypropylene block copolymer containing about 17 oxyethylene units and about 13 oxpropylene units, and about 6 parts of sodium castor oil sulphate (50 percent water). The resulting mixture is reacted with a solution of about 116 parts of an equimolar mixture of diphenyl chloromethane-4,4'-diisocyanate and tri-beta-chloroethyl phosphite in about 116 parts of 4,4'-diphenyl methane diisocyanate. A foam material is formed which has very good flame-resistance and the following physical properties:

| | |
|---|---|
| Density _____ kg./m.³ | 41 |
| Compressive strength _____ kg./cm.² | 1.7 |
| Impact toughness _____ kg./cm.² | 0.3 |
| Hot-Bending strength _____ ° C. | 147 |
| Water absorption _____ percent | 1.8 |

*Example 7*

About 50 parts of the polyether employed in Example 6 are mixed with about 50 parts of propoxylated phosphoric acid (11.6 percent OH), about 2 parts of permethylated aminoethyl piperazine, about 0.2 part of dibutyl tin dilaurate, about 0.5 part of the alkyl silane oxyalkylene block copolymer of Example 6 and about 6 parts of sodium castor oil sulphate (50 percent water). The resulting mixture is reacted with a solution of about 10 parts of an equimolar mixture of tri-beta-chloroethyl phosphite and the isocyanate mixture employed in Example 4 in about 149 parts of 4,4'-diphenyl methane diisocyanate. A foam material is formed which has very good flame-resistance and the following physical properties:

| | |
|---|---|
| Density _____ kg./m.³ | 34 |
| Compressive strength _____ kg./cm.² | 1.2 |
| Impact toughness _____ kg./cm.² | 0.4 |
| Hot-Bending strength _____ ° C. | 123 |
| Water absorption _____ percent | 1.3 |

It is to be understood that the foregoing examples only illustrate this invention and that if the teachings of the disclosure are followed, any other suitable isocyanate, active hydrogen containing compound, aliphatic phosphite and the like may be used.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for making condensation products containing phosphonic acid diester groups which comprises reacting a trialiphatic phosphite where the aliphatic radical is selected from the group consisting of hydrocarbon and halohydrocarbon with an active hydrogen containing compound selected from the group consisting of water, an alcohol, a phenol, a primary amine, a secondary amine, a carboxylic acid and a mercaptan, and an alpha-halo-alkyl-aryl isocyanate wherein aryl is selected from the group consisting of phenylene, chlorophenylene, alkyl phenylene and naphthylene.

2. The process of claim 1 wherein said trialiphatic phosphite, said alpha-halo-alkyl-aryl isocyanate and said active hydrogen containing compound are reacted simultaneously.

3. The process of claim 1 wherein said trialiphatic phosphite, said isocyanate and said active hydrogen containing compound are reacted together simultaneously at temperature of from about 15° C. to about 180° C.

4. The process of claim 1 wherein said isocyanate is a polyisocyanate.

5. The process of claim 1 wherein said isocyanate is 4-chloromethyl-1,3-phenylene diisocyanate.

6. The process of claim 1 wherein said isocyanate is diphenylchloromethane-4,4'-diisocyanate.

7. The process of claim 1 wherein said alkyl phosphite is tri-beta-chloroethyl phosphite.

8. A process for making condensation products containing phosphonic acid diester groups which comprises simultaneously reacting a trialiphatic phosphite where the aliphatic radical is selected from the group consisting of hydrocarbon and halo-hydrocarbon with a polyhydric alcohol and an alpha-halo-alkyl-aryl isocyanate wherein aryl is selected from the group consisting of phenylene, chlorophenylene, alkyl phenylene and naphthylene at a temperature of from about 15° C. to about 180° C.

9. The process of claim 8 wherein the proportion of said trialiphatic phosphite to said alpha-halo-alkyl-aryl isocyanate is substantially equivalent for reaction of all of the alpha-halo-alkyl radicals of said isocyanate and the proportion of said polyhydric alcohol is sufficient to react with substantially all of the isocyanate radicals of said polyisocyanate.

10. A compound having the formula

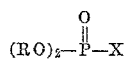

wherein R is an alkyl radical and X is a radical obtained by removing the halogen atom from an alpha-halo-alkyl aryl isocyanate wherein aryl is selected from the group consisting of phenylene, chlorophenylene, alkyl phenylene and naphthylene.

11.

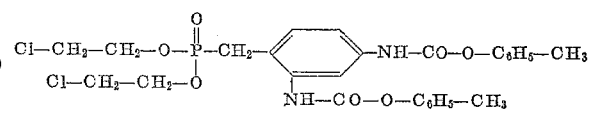

12.

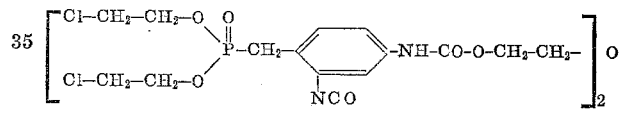

13.

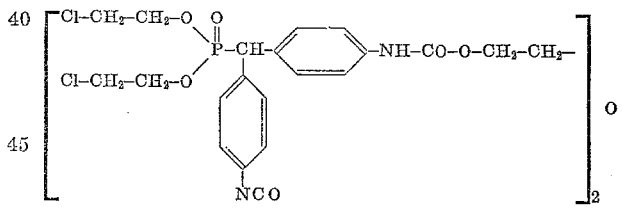

14.

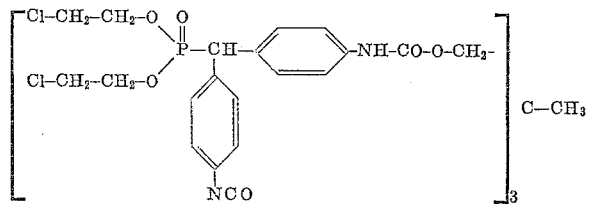

References Cited in the file of this patent

UNITED STATES PATENTS

| | | |
|---|---|---|
| 2,691,567 | Kvalnes et al. | Oct. 12, 1954 |
| 2,898,300 | Norton et al. | Aug. 4, 1959 |
| 2,909,558 | Reetz | Oct. 20, 1959 |
| 2,971,019 | Ladd et al. | Feb. 7, 1961 |
| 3,048,613 | Ladd et al. | Aug. 7, 1962 |

OTHER REFERENCES

Saunders et al.: J. Chem. Soc., 1948, p. 703.
Saunders et al.: Chemical Reviews, October 2, 1948, vol. 43, pp. 203–218.